United States Patent
Dupree et al.

(10) Patent No.: US 6,796,077 B1
(45) Date of Patent: Sep. 28, 2004

(54) ILLUMINATIVE FISHING LURE WITH HOOK/WEED GUARD CIRCUIT SWITCH

(76) Inventors: Banks Dupree, 1110 W. Booker Cir., Petersburg, VA (US) 23803; James C Squire, 1949 Nountain View Rd., Buena Vista, VA (US) 24446; Matthew R Hyre, 510 S. Main St., Lexington, VA (US) 24450

( * ) Notice: Subject to any disclaimer, the term of this patent is extended or adjusted under 35 U.S.C. 154(b) by 0 days.

(21) Appl. No.: 10/419,626

(22) Filed: Apr. 21, 2003

(51) Int. Cl.$^7$ .............................................. A01K 75/02
(52) U.S. Cl. ...................................................... 43/17.6
(58) Field of Search ................................ 43/17.5, 17.6

(56) References Cited

U.S. PATENT DOCUMENTS

| | | | |
|---|---|---|---|
| 2,217,565 A | 10/1940 | Seigle et al. | |
| 4,085,538 A | * 4/1978 | Jankowski | 43/17.6 |
| 4,250,650 A | 2/1981 | Fima | |
| 4,250,651 A | 2/1981 | Ramme | |
| 4,347,681 A | 9/1982 | Fima | |
| 4,672,765 A | 6/1987 | Lutz | |
| 5,063,700 A | 11/1991 | Kiefer et al. | |
| 5,175,951 A | 1/1993 | Fruchey | |
| 5,195,266 A | 3/1993 | Troescher | |
| 5,392,555 A | 2/1995 | Tingey | |
| 5,495,690 A | * 3/1996 | Hunt | 43/17.6 |
| 5,697,182 A | 12/1997 | Rodgers | |
| 5,758,450 A | 6/1998 | Young | |
| 5,822,909 A | * 10/1998 | Kalagian | 43/17.6 |
| 6,029,388 A | 2/2000 | Yokogawa et al. | |
| 6,055,763 A | * 5/2000 | Trotter | 43/17.6 |
| 6,079,144 A | * 6/2000 | Morgan et al. | 43/17.6 |
| 6,098,331 A | 8/2000 | Kim et al. | |
| 6,546,666 B2 | * 4/2003 | Schultz et al. | 43/17.6 |

* cited by examiner

Primary Examiner—Kurt Rowan
(74) Attorney, Agent, or Firm—MacLane C. Key, Inc.; MacLane C. Key

(57) ABSTRACT

An illuminating fishing lure having a lure body with a first lure end and second lure end. A light source positioned the lure body and a hook, having a base and a barb, is connected to and extends from the first lure end, wherein the base is electrically connected to the light source. A guard having a first guard end and a second guard end extends from and is connected to a side of the lure body at a first guard end thereof. The guard has a length substantially equal to the hook to allow contact of the second guard end with the barb. The lure further includes a power source having a negative charge end and positive charge end. The positive charge end is connected to the light source and the negative charge end is connected to the first guard end. Upon connection thereof the light source is illuminated.

17 Claims, 9 Drawing Sheets

ILLUMINATIVE FISHING LURE WITH HOOK/WEED GUARD CIRCUIT SWITCH

BACKGROUND OF THE INVENTION

1. Field of the Invention

The present invention relates generally to illuminative fishing lures and, more specifically, to an illuminative fishing lure having a rechargeable power source that is hermetically sealed within a non-conductive matrix. The fishing lure is formed as a circuit having two contacts, that when brought into contact with one another completes the circuit and illuminates an LED.

2. Description of the Prior Art

There are other illuminative fishing lures. Typical of these are U.S. Pat. Nos. 2,217,565; 4,250,650; 4,250,651; 4,347,681; 4,672,765; 5,063,700; 5,175,951; 5,195,266; 5,392,555; 5,175,951; 5,758,450; 5,697,182; 6,029,388; and 6,098,331. While these illuminative fishing lures may be suitable for the purposes for which they were designed, they would not be as suitable for the purposes of the present invention, as hereinafter described.

U.S. Pat. No. 2,217,565

Inventor: William Seigle et al.

Issued: Oct. 8, 1940

In a fishing lure, the combination with a sealed hollow body, and an electrical lighting unit within the body, of: a wire cage extending longitudinally around said body, one end of the cage passing through one end of said body to form a pivotal connection; line attaching means formed integrally at one end of wire cage; integral hook carrying means formed at intervals along said cage; and hooks carried by said last mentioned means.

U.S. Pat. No. 4,250,650

Inventor: Raoul G. Fima

Issued: Feb. 17, 1981

A fishing lure containing one or more light sources includes a guideway along which a battery rolls back and forth in response to an oscillatory movement of the lure. A series of spaced-apart stationary electrical contacts are positioned along the guideway to be successively engaged by the moving battery to intermittently complete a circuit and energize the light sources. The light sources are internally mounted for protection by the body of the lure and the light is transmitted to exterior locations by optical conductors.

U.S. Pat. No. 359,372

Inventor: Clarence Ramme

Issued: Feb. 17, 1981

The invention includes an elongated central body portion having an elongated air chamber formed therein and a battery chamber parallelly disposed to and spaced from the air chamber, both chambers extending substantially the length of the central body portion. A rear cap is removably secured to the rear end of the central body portion and a translucent front section is threadedly connected to the front end of the central body portion. At least one battery is mounted in the battery chamber. A light bulb has the base thereof in abutment with a shoulder formed at the outer end of the battery chamber whereby the bulb portion extends into the translucent front section. A coil spring is mounted between the rear end of the battery and the rear cap so that when the rear cap is secured to central body portion contact is made between the light bulb and the battery.

U.S. Pat. No. 4,347,681

Inventor: Raoul G. Fima

Issued: Sep. 7, 1982

A fishing lure containing one or more light sources includes a guideway along which an electrical contact moves back and forth in response to an oscillatory movement of the lure. A series of spaced-apart stationary electrical contacts are positioned along the guideway to be successively engaged by the movable contact to intermittently complete a circuit and energize the light sources. The light sources are internally mounted for protection by the body of the lure and the light is transmitted to exterior locations by optical conductors.

U.S. Pat. No. 4,672,765

Inventor: Erno B. Lutz

Issued: Jun. 16, 1987

A fish attraction device having a case and wing and wing support members. The wing automatically assumes a diving angle when trolling and an upward angle when a fish is hooked. The case may be provided with a flashing light circuit which has a phosphorescent coated light bulb.

U.S. Pat. No. 5,063,700

Inventor: David L. Kiefer

Issued: Nov. 12, 1991

A fish bait and lure illuminator is comprised of a watertight housing containing an electrical battery and a bulb which provides a source of illumination in the housing. An optical fiber extends into the housing and has its inner end close to the light source. Light is conducted through the optical fiber out of the housing, through the length of optical fiber with little or no attention. The external end of the fiber optic acts as a lens to give off light similar in intensity to the source of illumination to illuminate the living, non-living bait or artificial lure.

U.S. Pat. No. 5,175,951

Inventor: Russell L. Fruchey

Issued: Jan. 5, 1993

A fishing lure comprising a lure body and being of a hollow construction with a predetermined configuration adopted for attracting a particular fish variety, said lure body having disposed interiorly thereof a light emitting diode (LED) and power supply means disposed interiorly of said body for energizing said light emitting diode; solid state electronic circuit means including first gate means connected to said power supply defining an oscillator coupled to said LED, and sensor means including electronic control, external sensors and a second gate means for actuating said first gate means when said electrodes are immersed in water whereby said LED is intermittently energized by said first gate means.

U.S. Pat. No. 5,195,266

Inventor: Robert H. Troescher

Issued: Mar. 23, 1993

A fish lure comprising a transparent tube containing a light emitting diode, a first metallic sleeve in contact with the inner wall of the tube, a second metallic sleeve in contact with the inner wall of the tube and with the first metallic sleeve, and a third metallic sleeve inside of and spaced from the second metallic sleeve. A power supply device is disposed in the first metallic sleeve in electrical communication with all of the sleeves and the diode.

U.S. Pat. No. 5,392,555

Inventor: Sheldon N. Tingey

Issued: Feb. 28, 1995

A new and improved illuminated fishing lure apparatus includes a housing assembly which simulates a body of an organism. The housing assembly also includes two transparent portions that simulate two eyes of the organism. Two hook assemblies are attached to the housing assembly. One hook assembly is attached to the rear most portion of the housing assembly. The other hook assembly is attached to the bottom of the housing assembly. Contained within the housing assembly, a pair of illuminators is positioned adjacent to the transparent eye-simulating portions of the housing assembly. The illuminators serve as sources of illumination for the transparent eye-simulating portions of the housing assembly. An electronic flashing circuitry is also contained within the housing assembly and is connected to the simulated-eye illuminators. The electronic flashing circuitry drives the illuminators at a predetermined flashing rate. Preferably, the illuminators are LEDs. The electronic flashing circuitry includes a battery supply, an electronic flasher module connected to the battery supply, and a flash-rate-change assembly connected to the electronic flasher module, for changing the predetermined flash rate at which the illuminators flash. Preferably, the electronic flasher module is an LM3909 flasher module.

U.S. Pat. No. 5,758,450

Inventor: Bruce A. Young

Issued: Jun. 2, 1998

Laser-illuminated lures which are characterized by lures of selected design having a hard or soft body and fitted with a laser beam-emitting mechanism or device which includes a laser emitter, a laser circuit board and a battery for energizing the circuit board and laser emitter. In a preferred embodiment the laser device is implanted in the lures and the laser emitter positioned to highlight one or more features of the lures such as a spinner, skirt, hook or the like to attract fish to the lure. In another preferred embodiment more than one laser device may be implanted or otherwise positioned inside a lure to highlight various features of the lure, as desired. The laser circuit may be energized by tightening a removable segment of the lure against a spring seated on the battery which supplies electricity to the laser circuit or by a switch mounted in the lure body.

U.S. Pat. No. 5,697,182

Inventor: Nicholas A. Rodgers

Issued: Dec. 16, 1997

A fishing lure will time an interval if a motion responsive switch closes in the absence of an interval. During the interval power is supplied to an output circuit. The output circuit may energize radiation probes, a light or a speaker.

U.S. Pat. No. 6,029,388

Inventor: Seiji Yokogawa

Issued: Feb. 29, 2000

It is an object of the present invention to provide a lure (A) which does not require batteries to be changed, and a lure (B) wherein the changing of batteries has been simplified. Lure (A) is structured in such a manner that a solar battery (10) housed within a fish-shaped case (1) serves to charge a secondary battery (11), thus rendering it unnecessary to change batteries. Meanwhile, lure (B) is structured in such a manner that a lid unit (23) holding a battery (24) and a light-emitting body (25) can be inserted into and released from an aperture within a fish-shaped case (21), it being possible to remove the battery (24) when the lid unit (23) is released, thus permitting the easy changing of batteries without the need for exaggerated action and without any risk of injuring the fingers on hooks (5). These lures are structured such as to have an illuminated band stretching from either side of the head, which is shaped in imitation of a fish, towards the underside, and thus facilitate improved efficacy in luring fish by means of a light-emitting lure.

U.S. Pat. No. 6,098,331

Inventor: Jaims M. Kim et al.

Issued: Aug. 8, 2000

A fishing lure emits continuous sine wave generated sounds to emulate the sounds produced by fish themselves. A waterproof casing contains electronic circuitry that includes a precision oscillator integrated circuit for generating a continuous sine wave sound that is swept about a predetermined center frequency of approximately 3.0 kHz and that extends between a low frequency of approximately 1.8 kHz and a high frequency of approximately 4.2 kHz. The output of the precision oscillator is coupled to a miniature piezoelectric speaker for audibly reproducing the generated sine wave sound. An LED flasher integrated circuit coupled to the precision oscillator integrated circuit serves to control a light emitting diode to flash at a predetermined rate or be constantly lit to thereby act as an additional fish attractor in combination with the emitted continuous sine wave sound.

SUMMARY OF THE PRESENT INVENTION

The present invention relates generally to illuminative fishing lures and, more specifically, to an illuminative fishing lure having a rechargeable power source that is hermetically sealed within a non-conductive matrix. The fishing lure is formed as a circuit having two contacts, that when brought into contact with one another completes the circuit and illuminates an LED.

A primary object of the present invention is to provide a fishing lure that overcomes the shortcomings of the prior art.

A secondary object of the present invention is to provide a fishing lure having rechargeable hermetically sealed electrical circuit therein.

Another object of the present invention is to provide a fishing lure having an LED connected thereto for illumination thereof.

Yet another object of the present invention is to provide a fishing lure that uses the typical hook and weed guard.

Still yet another object of the present invention is to provide a fishing lure having an electrical switch for closing an electrical circuit formed by the connection between a fish hook and a weed guard.

Still another object of the present invention is to provide a fishing lure with an open electrical circuit when the weed guard is disengaged from the hook.

Yet another object of the present invention is to provide a rechargeable source of energy to illuminate a fishing lure by sealing a rechargeable battery or batteries within a non-conductive matrix.

Another object of the present invention is to recharge a fishing lure by connecting an external power source to the fish hook and weed guard that is disengaged from one another.

Still yet another object of the present invention is to provide an illuminative fishing lure with a hermetically sealed rechargeable power source that is inexpensive to manufacture and operate.

A further object of the present invention is to provide an illuminated fishing lure with a hermetically sealed rechargeable power source that is simple and easy to use.

Additional objects of the present invention will appear as the description proceeds.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the Figures illustrate the illuminating fishing lure of the present invention. With regard to the reference numerals used, the following numbering is used throughout the various drawing Figures.

1 weeds
2 fish
3 water
10 illuminating fishing lure of the present invention
12 lure body
13 charging diode
14 LED light
16 hook
18 weed guard
20 eye
22 first connection point
24 switch
26 power source
27 non-conductive housing
28 metal bracket
30 first compression spring
31 outer shell
32 second compression spring
33 recess
34 cork
35 channel
36 external power source
38 power cord
40 positive connector
42 negative connector
44 streamers
46 jerk baits
48 diamond jigs

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Turning now descriptively to the drawings, in which similar reference characters denote similar elements throughout the several views, FIGS. 1 through 9 illustrate an illuminating fishing lure of the present invention generally by the numeral 10.

Figure 1:
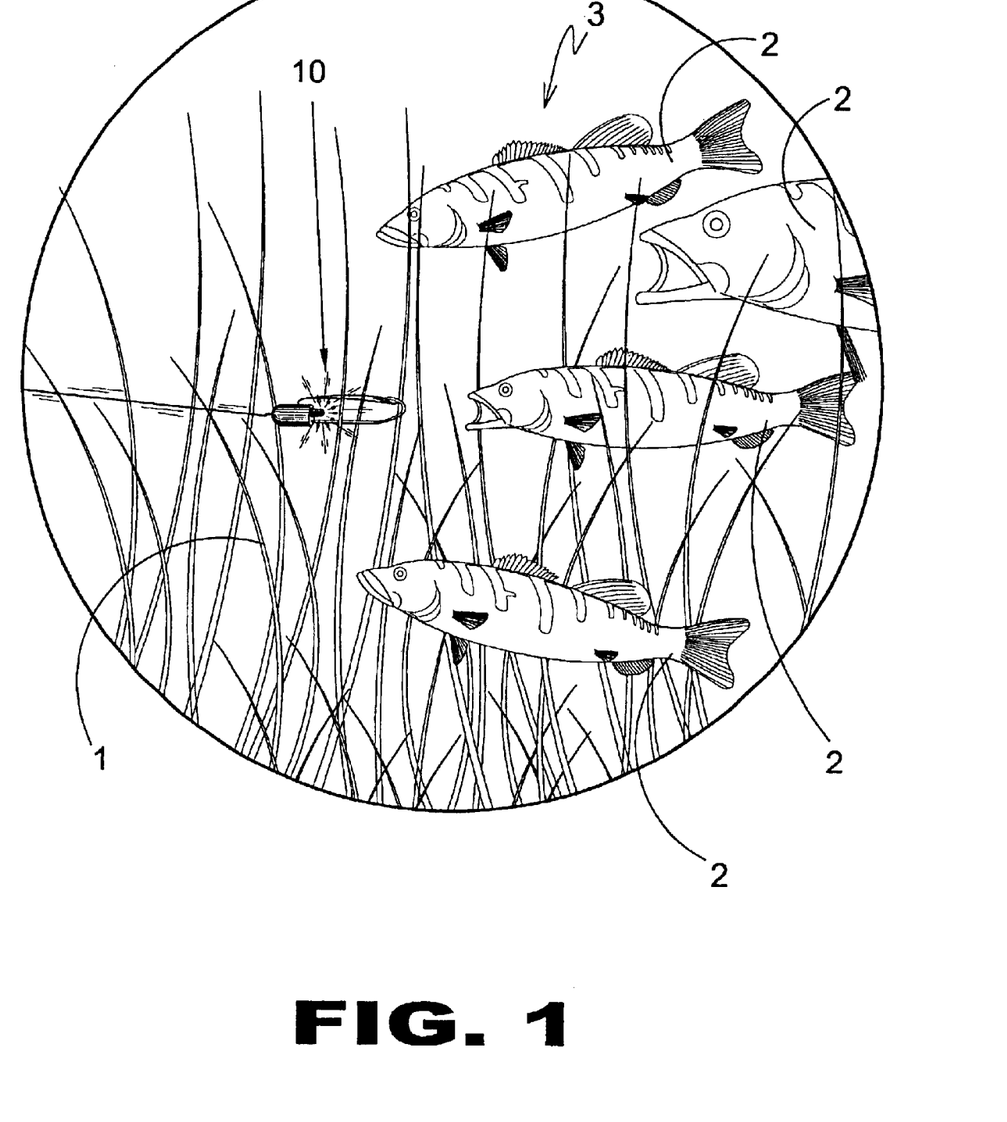
FIG. 1 is an illustrative view of the illuminating fishing lure of the present invention being illuminated and attracting fish thereto.

FIG. 1 is an illustrative view of the illuminating fishing lure 10 (hereinafter "lure") of the present invention being illuminated and attracting fish thereto. It is known that having a lure that is illuminated helps the fisherman attract certain types of fish. As seen in this figure, the lure 10 is connected to a fishing line 5 and is submerged in water 3. The lure 10 has a body 12 and includes a hook 16 and a weed guard 18 extending from the body 12. The lure 10 also includes an LED light 14 extending therefrom and is shown in an illuminated state. The lure 10 of the present invention is shown amongst a plurality of weeds 1. Herein, a plurality of fish 2 is shown navigating the weeds 1 of the water 3. The fish 2 are attracted to the illuminated lure 10 of the present invention. The manner in which the lure is illuminated will be discussed in greater detail with specific reference to FIGS. 2 through 8. The power source for the light of the lure 10 of the present invention is a rechargeable power source that is sealed entirely within the body of the lure 10. In order for the led light 14 to be illuminated, an electrical circuit must be completed. The circuit is completed upon the weed guard 18 contacting the hook 16 thereby causing power from the rechargeable power source to be provided to the LED light 14. Also upon completion of the circuit, the rechargeable power source is being recharged. Upon disengagement of the weed guard 18 from the hook 16, the circuit is disrupted and the LED light 14 is no longer illuminated. The circuit of the lure 10 of the present invention will be discussed in greater detail with specific reference to FIGS. 3 through 8.

Figure 2:
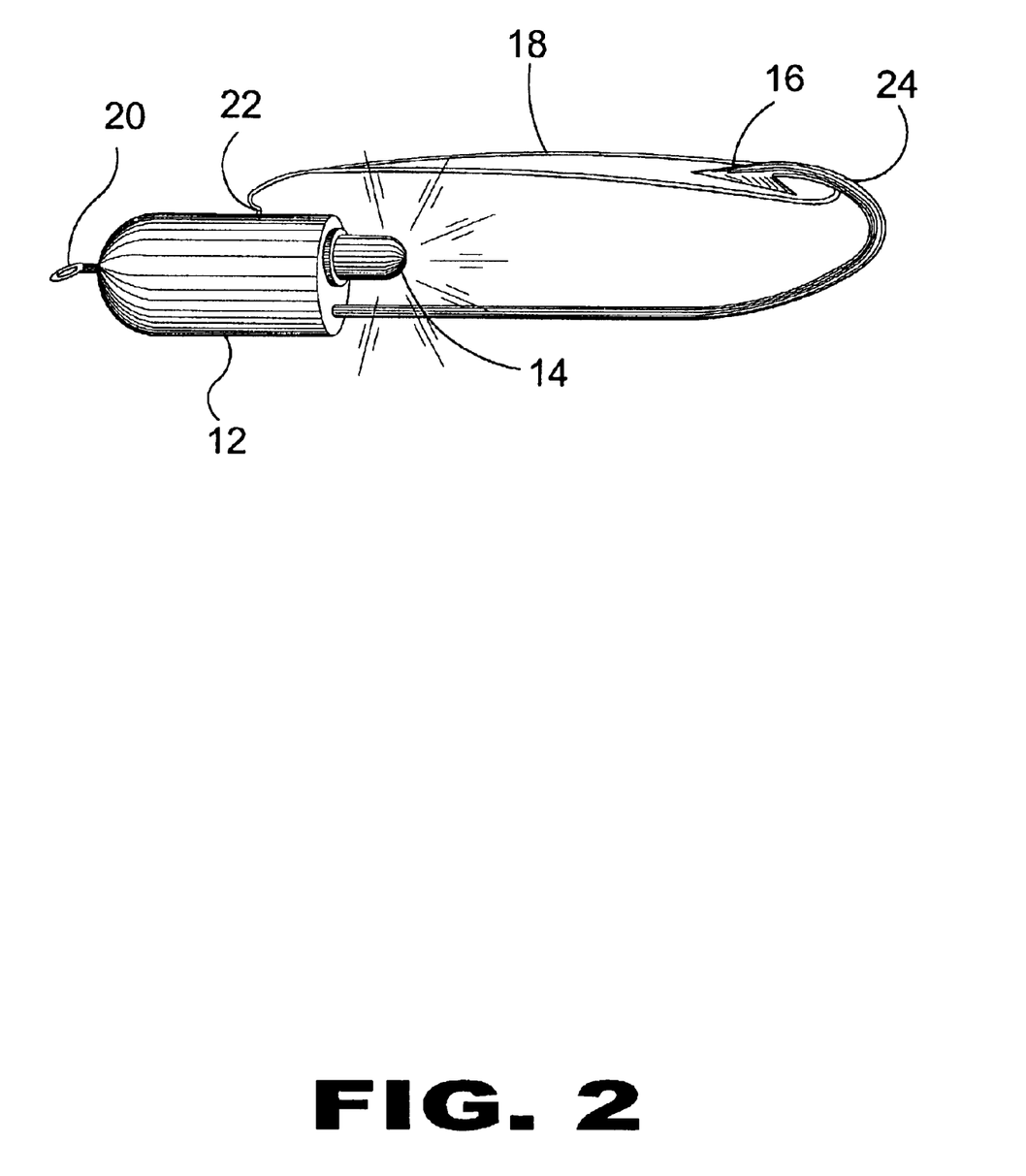
FIG. 2 is a perspective view of the illuminating fishing lure of the present invention.

FIG. 2 is a perspective view of the illuminating fishing lure of the present invention. The lure 10 of the present invention includes the body 12. The lure body 12 is preferably cylindrical in shape and has a solid outer casing with a hollow interior. The interior components in the lure body 12 of the lure 10 will be discussed with specific reference to FIG. 3 and 8. The lure body has a first end and second end. An eye 20 extends from the second end of the lure body 12. The user of the illuminating fishing lure 10 of the present invention connects fishing line through the eye 20 prior to submerging the lure 10 in water. The LED light 14 extends from a first end of the lure body 12, opposite the second end. The LED light 14 is selectively illuminated when power is provided thereto.

Also extending from a first end of the lure body 12 is the hook 16. The hook 16 of the lure 10 has a conventional shape for catching fish. However, the hook 16 of the present invention is formed from an electrically conductive material, such as a metal. Also, the hook 16 should be able to sufficiently resist any corrosive effects caused by prolonged exposure to water. However, while it is preferred that the hook be formed from metal, any material that is both electrically conductive and non-corrosive may be used in the manufacture of the hook 16 for the illuminating lure 10 of the present invention.

The weed guard 18 is connected on the lure body at a position that is substantially between the first end and a second end. The weed guard has a lasso shape that extends substantially to the tip of the hook 16. The weed guard 18 is generally in one of two positions. The first closed position is shown in FIG. 2. The open end of the lasso of the weed guard 18 is shown connected against the tip of the hook 16. The weed guard 18 should be formed from an electrically conductive material and should also be stiff so as to prevent disengagement of the weed guard 18 from the hook 16 without a predetermined amount of force applied thereto. Preferably, the amount of force needed to disengage the weed guard 18 from the hook 16 is the amount of force associated with the closing of a fish's mouth.

The weed guard 18 connects to the hook 16 at switch point 24. Upon connection, an electrical circuit is completed and power is provided to the LED light 14 thereby causing the LED light 14 to be illuminated. Also, upon connection of the weed guard 18 to the hook 16 at switch point 24, the power source providing power to the LED light 14 is recharged. The power source of the lure 10 is able to be used for a prolonged period of time in which power is provided to illuminate the LED light 14 of the lure 10 of the present invention.

Figure 3:
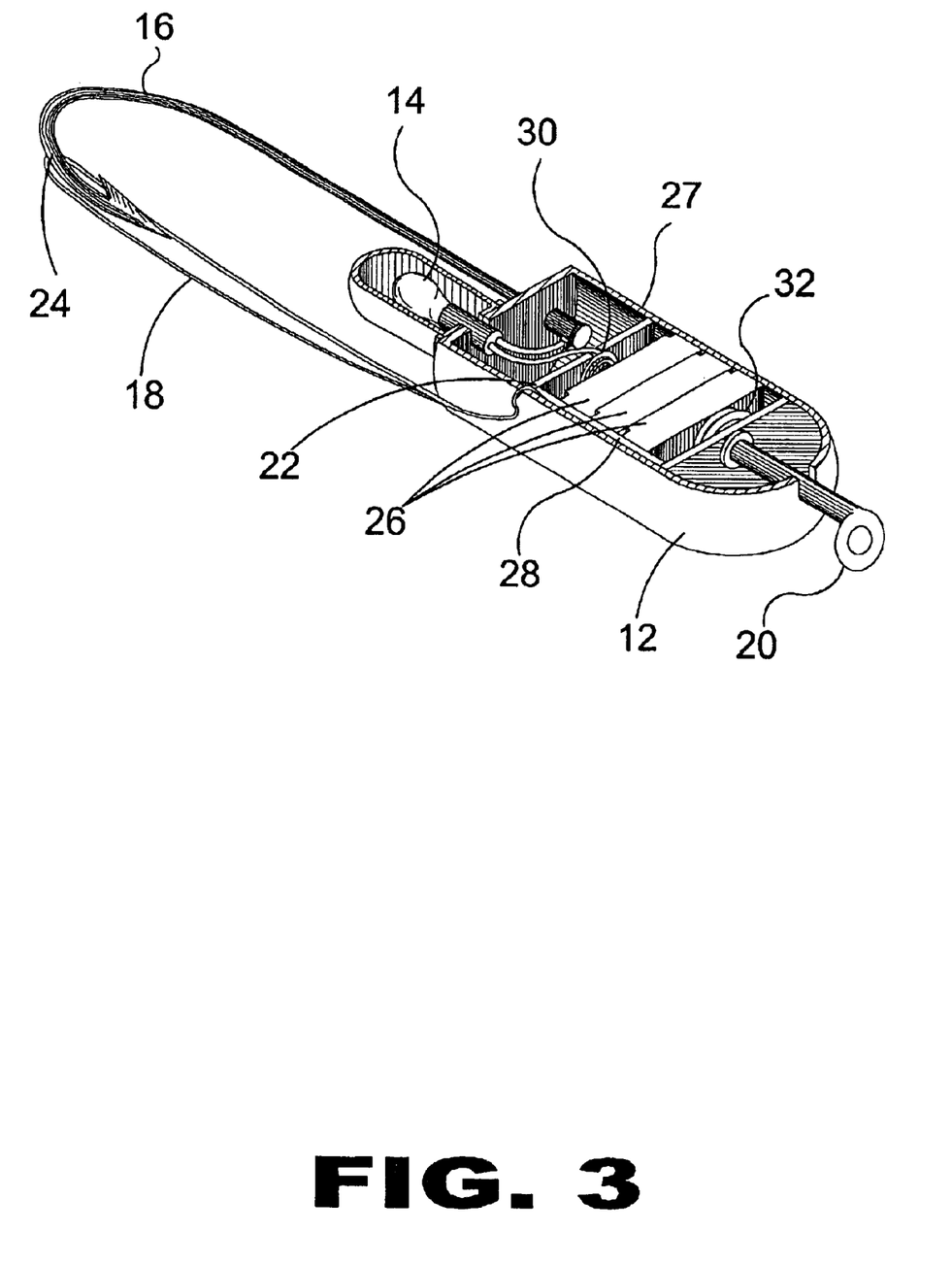
FIG. 3 is a sectional view of the lure body of the illuminating fishing lure of the present invention showing the electrical circuit contained therein.

FIG. 3 is a sectional view of the lure body of the illuminating fishing lure of the present invention showing the electrical circuit contained therein. The lure 10 of the present invention includes the body 12. The lure body 12 is preferably cylindrical in shape and has a solid outer casing with a hollow interior. The lure body has a first end and second end. An eye 20 extends from the second end of the lure body 12. The user of the illuminating fishing lure 10 of the present invention connects fishing line through the eye 20 prior to submerging the lure 10 in water. The LED light 14 extends from a first end of the lure body 12, opposite the second end. The LED light 14 is selectively illuminated when power is provided thereto.

Also extending from a first end of the lure body 12 is the hook 16. The hook 16 of the lure 10 has a conventional shape for catching fish and has a base and a barb. However, the hook 16 of the present invention is formed from an electrically conductive material, such as a metal. Also, the hook 16 should be able to sufficiently resist any corrosive effects caused by prolonged exposure to water. However, while it is preferred that the hook be formed from metal, any material that is both electrically conductive and non-corrosive may be used in the manufacture of the hook 16 for the illuminating lure 10 of the present invention.

The weed guard 18 is connected on the lure body on a side thereof. Preferably, the weed guard 18 is connected at a position that is substantially between the first end and a second end. The weed guard has a lasso shape that extends substantially to the tip of the hook 16. The weed guard 18 is generally in one of two positions. The first closed position is shown in FIG. 2. The open end of the lasso of the weed guard 18 is shown connected against the tip of the hook 16. The weed guard 18 should be formed from an electrically conductive material and should also be stiff so as to prevent disengagement of the weed guard 18 from the hook 16 without a predetermined amount of force applied thereto. Preferably, the amount of force needed to disengage the weed guard 18 from the hook 16 is the amount of force associated with the closing of a fish's mouth.

Positioned within the lure body 12 of the lure is a metal bracket 28. The metal bracket 28 is positioned within the body 12 at substantially the point where an end of the weed guard 18, opposite the switch point 24, connects to the body 12. The weed guard 18 is mechanically and electrically connected to the body 12 at a connection point 22 wherein it is further connected to the metal bracket 28. Positioned with the metal bracket 28 is the power source 26. Preferably, the power source is at least one battery, however, a plurality of batteries may be used as well. While batteries are the preferred source of power for the power source 26, any material that could provide power may be used by the lure 10 of the present invention. The power source 26 is held securely within the metal bracket 28 by a first and second compression springs, 30 and 32, respectively. The first compression spring 30 is positioned on an inner side of the metal bracket 28 that is closest to the LED light 14. The second compression spring 32 is positioned on an inner side of the metal bracket 28 closest to the eye 20. The power source 26 is connected to an end of the hook 16 that protrudes inside the body 12. The LED light 14 is connected to the metal bracket 28. Alternatively, the power source 26 can be connected to the weed guard 18 and the hook 16 can be connected to the LED light 14.

An electrical circuit is complete when the weed guard 18 contacts the hook 16 at the switch point 24. Upon contact, current flows from the power source 26 through the hook 16 and further through the weed guard 18. Current is then provided to the metal bracket 28 which is connected to the LED light 14. Power is thus provided to the LED light 14 and causes the LED light 14 to be illuminated. The LED light 14 remains illuminated until the weed guard 18 is disengaged from the hook 16 which thereby causes the electrical circuit to be opened and power is prevented from reaching the LED light 14. Additionally, upon completion of the electrical circuit, the power source 26 is recharged by a recharging diode so as to extend the life of the power source 26.

The lure body 12 is also formed form a non-conductive material to provide insulation which prevents the water which comes into contact with the lure body 12 from shorting out the power source 26 located therein.

Figure 4:
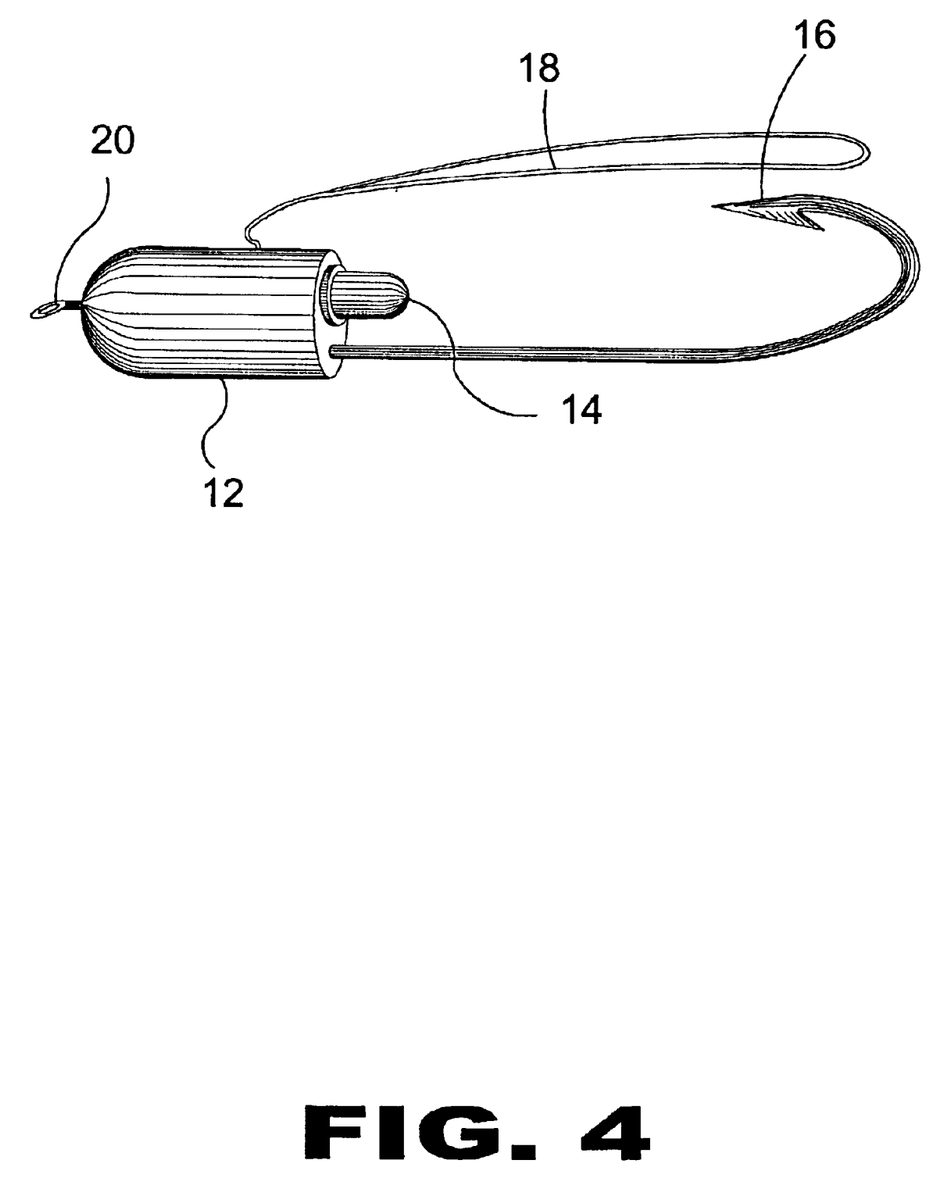
FIG. 4 is a perspective view of the illuminating fishing lure of the present invention with the weed guard disengaged from the hook.

FIG. 4 is a perspective view of the illuminating fishing lure of the present invention with the weed guard disengaged from the hook. The lure 10 of the present invention includes the body 12. The lure body 12 is preferably cylindrical in shape and has a solid outer casing with a hollow interior. The interior components in the lure body 12 of the lure 10 will be discussed with specific reference to FIGS. 3 and 8. The lure body has a first end and second end. An eye 20 extends from the second end of the lure body 12. The user of the illuminating fishing lure 10 of the present invention connects fishing line through the eye 20 prior to submerging the lure 10 in water. The LED light 14 extends from a first end of the lure body 12, opposite the second end. The LED light 14 is selectively illuminated when power is provided thereto.

Also extending from a first end of the lure body 12 is the hook 16. The hook 16 of the lure 10 has a conventional shape for catching fish. However, the hook 16 of the present invention is formed from an electrically conductive material, such as a metal. Also, the hook 16 should be able to sufficiently resist any corrosive effects caused by prolonged exposure to water. However, while it is preferred that the hook be formed from metal, any material that is both electrically conductive and non-corrosive may be used in the manufacture of the hook 16 for the illuminating lure 10 of the present invention.

The weed guard 18 is connected on the lure body at a position that is substantially between the first end and a second end. The weed guard has a lasso shape that extends substantially to the tip of the hook 16. The weed guard 18 is generally in one of two positions. The first closed position is shown in FIG. 2. The open end of the lasso of the weed guard 18 is shown connected against the tip of the hook 16. The weed guard 18 should be formed from an electrically conductive material and should also be stiff so as to prevent disengagement of the weed guard 18 from the hook 16 without a predetermined amount of force applied thereto. Preferably, the amount of force needed to disengage the weed guard 18 from the hook 16 is the amount of force associated with the closing of a fish's mouth.

As shown in FIG. 4, the weed guard 18 is disengaged from the hook 16. When the weed guard 18 is disengaged from the hook 16, the electrical circuit is open and no power flows from the power source to the LED light 14 and therefore the LED light 14 is not illuminated. As the weed guard 18 and the hook 16 are not in contact with one another, an external power source can be connected thereto for charging of the power source 26. Externally charging the power source 26 will be discussed with specific reference to FIG. 7.

Figure 5:
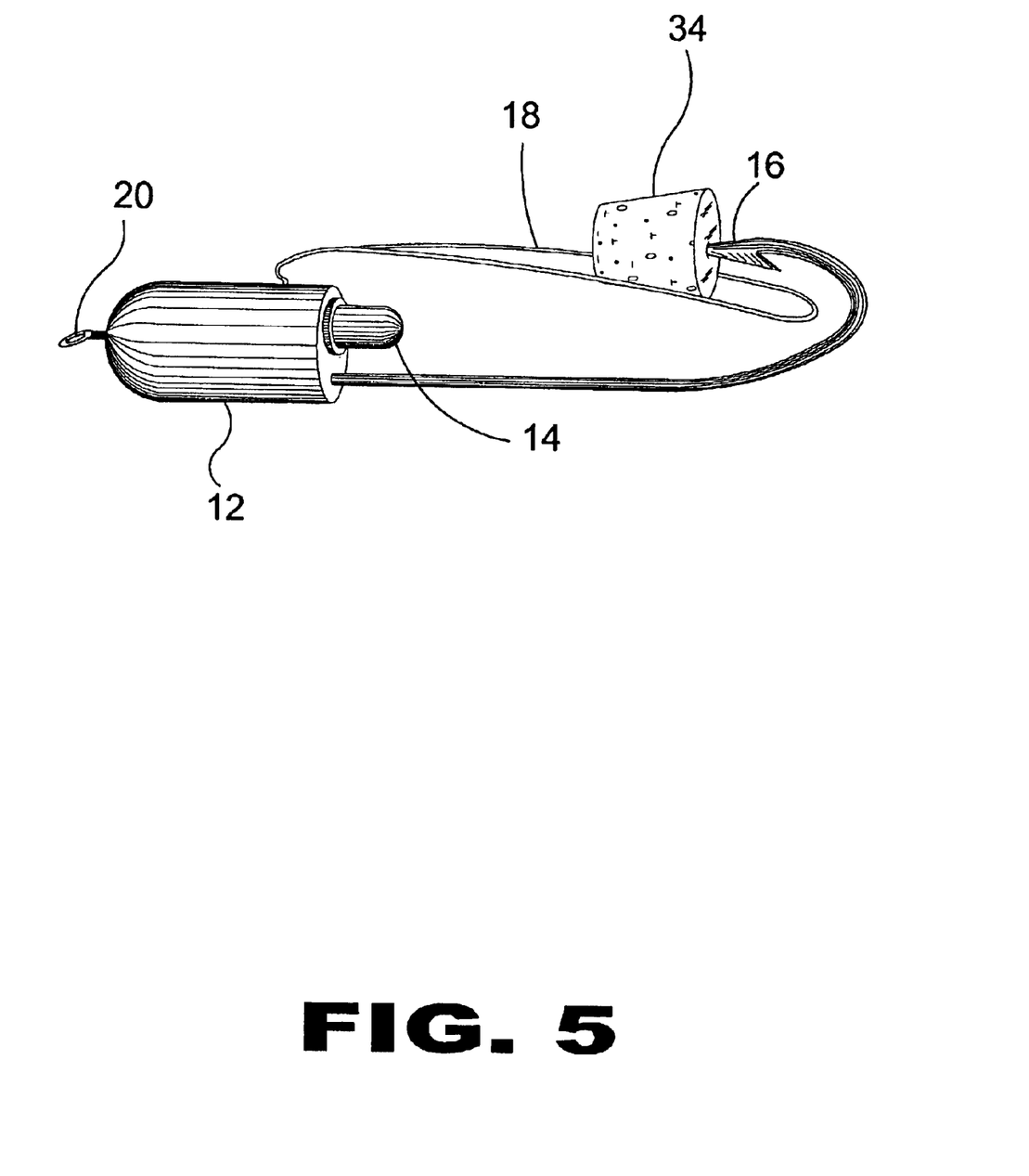
FIG. 5 is a perspective view of the illuminating fishing lure of the present invention ready for storage with the LED not illuminated.

FIG. 5 is a perspective view of the illuminating fishing lure of the present invention ready for storage with the LED not illuminated. The lure 10 of the present invention includes the body 12. The lure body 12 is preferably cylindrical in shape and has a solid outer casing with a hollow interior. The interior components in the lure body 12 of the lure 10 will be discussed with specific reference to FIGS. 3 and 8. The lure body has a first end and second end. An eye 20 extends from the second end of the lure body 12. The user of the illuminating fishing lure 10 of the present invention connects fishing line through the eye 20 prior to submerging the lure 10 in water. The LED light 14 extends from a first end of the lure body 12, opposite the second end. The LED light 14 is selectively illuminated when power is provided thereto.

Also extending from a first end of the lure body 12 is the hook 16. The hook 16 of the lure 10 has a conventional shape for catching fish. However, the hook 16 of the present invention is formed from an electrically conductive material, such as a metal. Also, the hook 16 should be able to sufficiently resist any corrosive effects caused by prolonged exposure to water. However, while it is preferred that the hook be formed from metal, any material that is both electrically conductive and non-corrosive may be used in the manufacture of the hook 16 for the illuminating lure 10 of the present invention.

The weed guard 18 is connected on the lure body at a position that is substantially between the first end and a second end. The weed guard has a lasso shape that extends substantially to the tip of the hook 16. The weed guard 18 is generally in one of two positions. The first closed position is shown in FIG. 2. The open end of the lasso of the weed guard 18 is shown connected against the tip of the hook 16. The weed guard 18 should be formed from an electrically conductive material and should also be stiff so as to prevent disengagement of the weed guard 18 from the hook 16 without a predetermined amount of force applied thereto. Preferably, the amount of force needed to disengage the weed guard 18 from the hook 16 is the amount of force associated with the closing of a fish's mouth.

As shown in FIG. 5, the weed guard 18 is disengaged from the hook 16. When the weed guard 18 is disengaged from the hook 16, the electrical circuit is open and no power flows from the power source to the LED light 14 and therefore the LED light 14 is not illuminated. In order to prevent the weed guard 18 from coming into contact with the hook 16, a cork 34 is placed on the end of the hook 16 thereby causing the weed guard 18 to remain in a disengaged position. Using a cork 34 is ideal for storing of the lure 10 so as to prevent inadvertent discharge of the power source 26. The cork 34 as a means for preventing contact between the weed guard 18 and the hook 16 is described for purposes of example and anything that can effective prevent the weed guard 18 from coming into contact with the hook 16 in order to store the lure 10 may be used.

Figure 6:
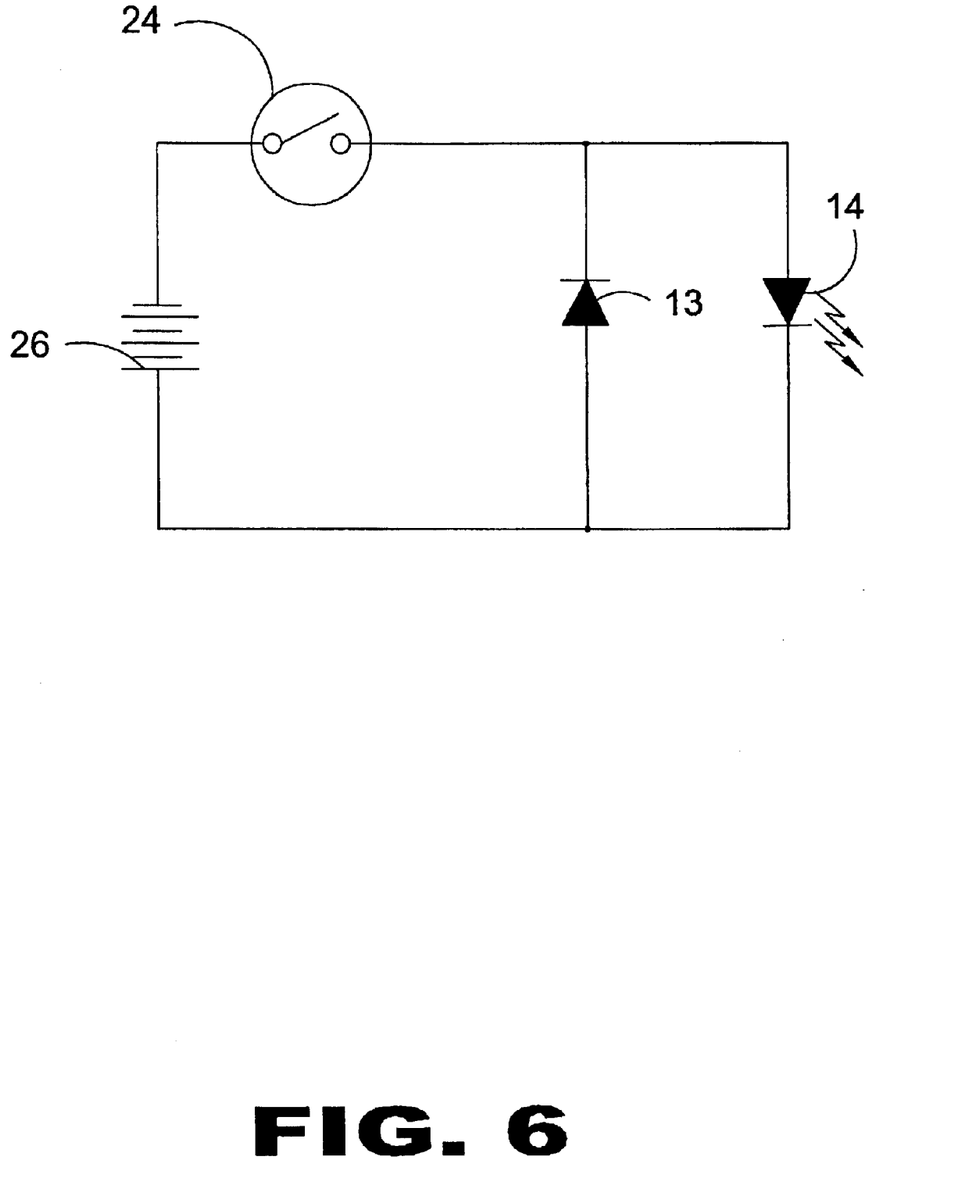
FIG. 6 is an electrical diagram of the illuminating fishing lure of the present invention.

FIG. 6 is an electrical diagram of the illuminating fishing lure of the present invention. The lure 10 of the present invention is illuminated upon completion of an electrical circuit. The electrical circuit includes the power source 26 contained within the metal bracket 28 which is connected to the hook 16. A weed guard 18 is connected to the LED light 14. Also, a charging diode 13 for recharging the power source 26 is connected in parallel with the LED light 14. A switch point 24 is connected between the power source 26 and both the charging diode 13 and the LED light 14. The switch point 24 is the point where hook 16 contacts the weed guard 18. When the weed guard 18 contacts the hook 16 the switch 24 is in the first closed position and the electrical circuit is completed. Upon completion of the electrical circuit, power flows from the power source 26 to both the charging diode 13 and the LED light 14. Upon receiving power, the LED light 14 is caused to be illuminated and the charging diode 13 is used to re-charge the power source 26. When the weed guard 18 disengages from the hook 16, the switch 24 is caused to move from its first closed position to its second open position. When the switch 24 is in the second open position, power from the power source 26 is unable to flow therefrom and the LED light 14 is not illuminated and the power source 26 is not recharged by the charging diode 13.

Figure 7:
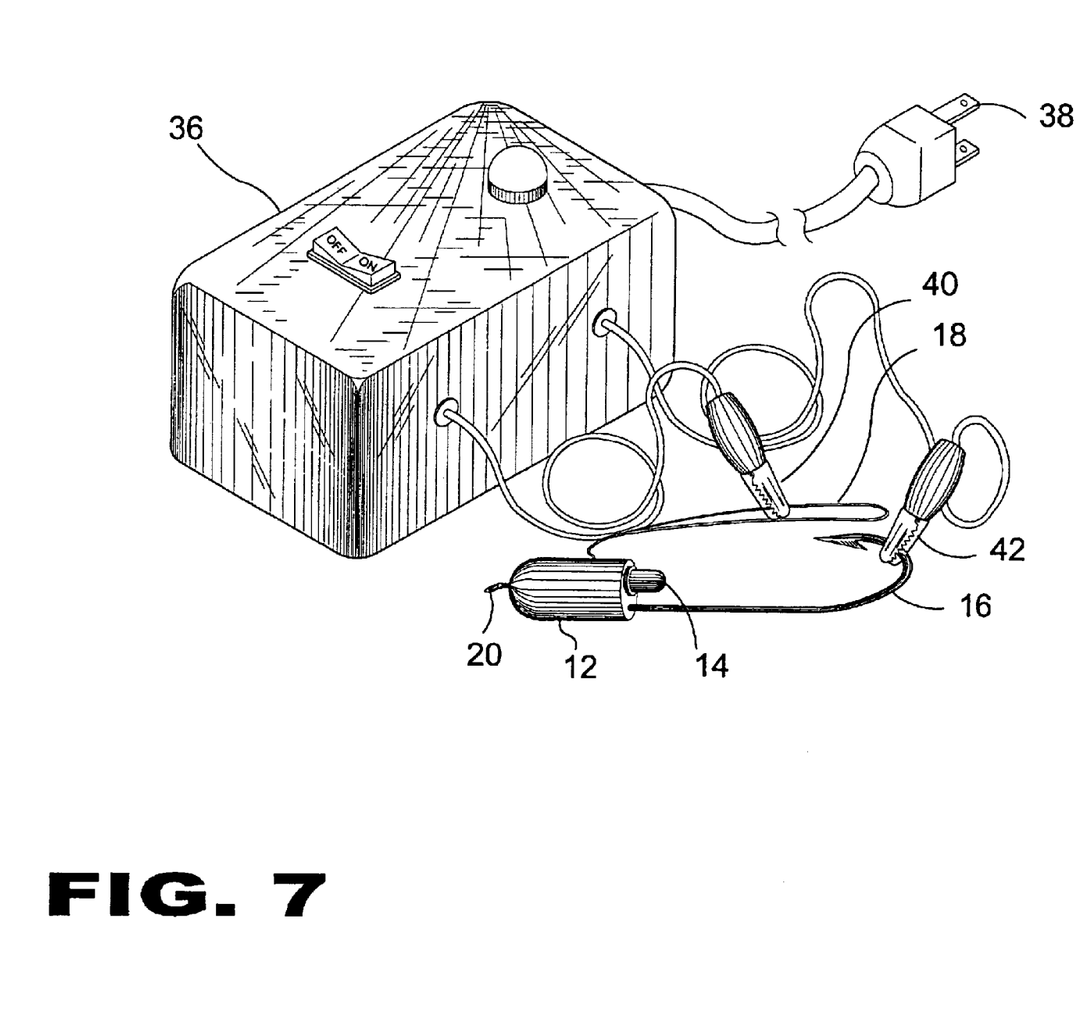
FIG. 7 is a perspective view of the illuminating fishing lure of the present invention being charge by an external power source.

FIG. 7 is a perspective view of the illuminating fishing lure of the present invention being charged by an external power source. The lure 10 of the present invention includes the body 12. The lure body 12 is preferably cylindrical in shape and has a solid outer casing with a hollow interior. The interior components in the lure body 12 of the lure 10 will be discussed with specific reference to FIGS. 3 and 8. The lure body has a first end and second end. An eye 20 extends from the second end of the lure body 12. The user of the illuminating fishing lure 10 of the present invention connects fishing line through the eye 20 prior to submerging the lure 10 in water. The LED light 14 extends from a first end of the lure body 12, opposite the second end. The LED light 14 is selectively illuminated when power is provided thereto.

Also extending from a first end of the lure body 12 is the hook 16. The hook 16 of the lure 10 has a conventional shape for catching fish. However, the hook 16 of the present invention is formed from an electrically conductive material, such as a metal. Also, the hook 16 should be able to sufficiently resist any corrosive effects caused by prolonged exposure to water. However, while it is preferred that the hook be formed from metal, any material that is both electrically conductive and non-corrosive may be used in the manufacture of the hook 16 for the illuminating lure 10 of the present invention.

The weed guard 18 is connected on the lure body at a position that is substantially between the first end and a second end. The weed guard has a lasso shape that extends substantially to the tip of the hook 16. The weed guard 18 is generally in one of two positions. The first closed position is shown in FIG. 2. The open end of the lasso of the weed guard 18 is shown connected against the tip of the hook 16. The weed guard 18 should be formed from an electrically conductive material and should also be stiff so as to prevent disengagement of the weed guard 18 from the hook 16 without a predetermined amount of force applied thereto. Preferably, the amount of force needed to disengage the weed guard 18 from the hook 16 is the amount of force associated with the closing of a fish's mouth.

The weed guard 18 is shown disengaged from the hook 16. When the weed guard 18 is disengaged from the hook 16, the electrical circuit is open and no power flows from the power source to the LED light 14 and therefore the LED light 14 is not illuminated. When the weed guard 18 is disengaged from the hook 16, a user could selectively connect an external power source 36 to the lure 10 of the present invention. Connection to the external power source 36 allows the power source 26 contained within the lure body 12 to be recharged. The external power source 36 has a power cord 38 extending therefrom for connection to an electrical outlet. Also extending from the external power source 36 is a positive charging connector 40 and a negative charging connector 42. In order to charge the power source 26 of the lure 10, the positive charging connector 40 is connected to the hook 16 and the negative charging connector 42 is connected to the weed guard 18. The external power source 36 is then switched from an off position to an on position so that the external power source 36 can receive power from a wall outlet through the power cord 38. The external power source 36 then transfers power through the positive connector 40 and the negative connector 42. The power from the positive connector 40 is received by the hook 16 where is it is transferred to the charging diode 13 as shown in FIG. 6. The power from the negative connector 42 is received by the weed guard 18 and is also transferred to the charging diode 13. Upon receiving power from the external power source 36, the charging diode 13 charges the power source 26.

Figure 8:
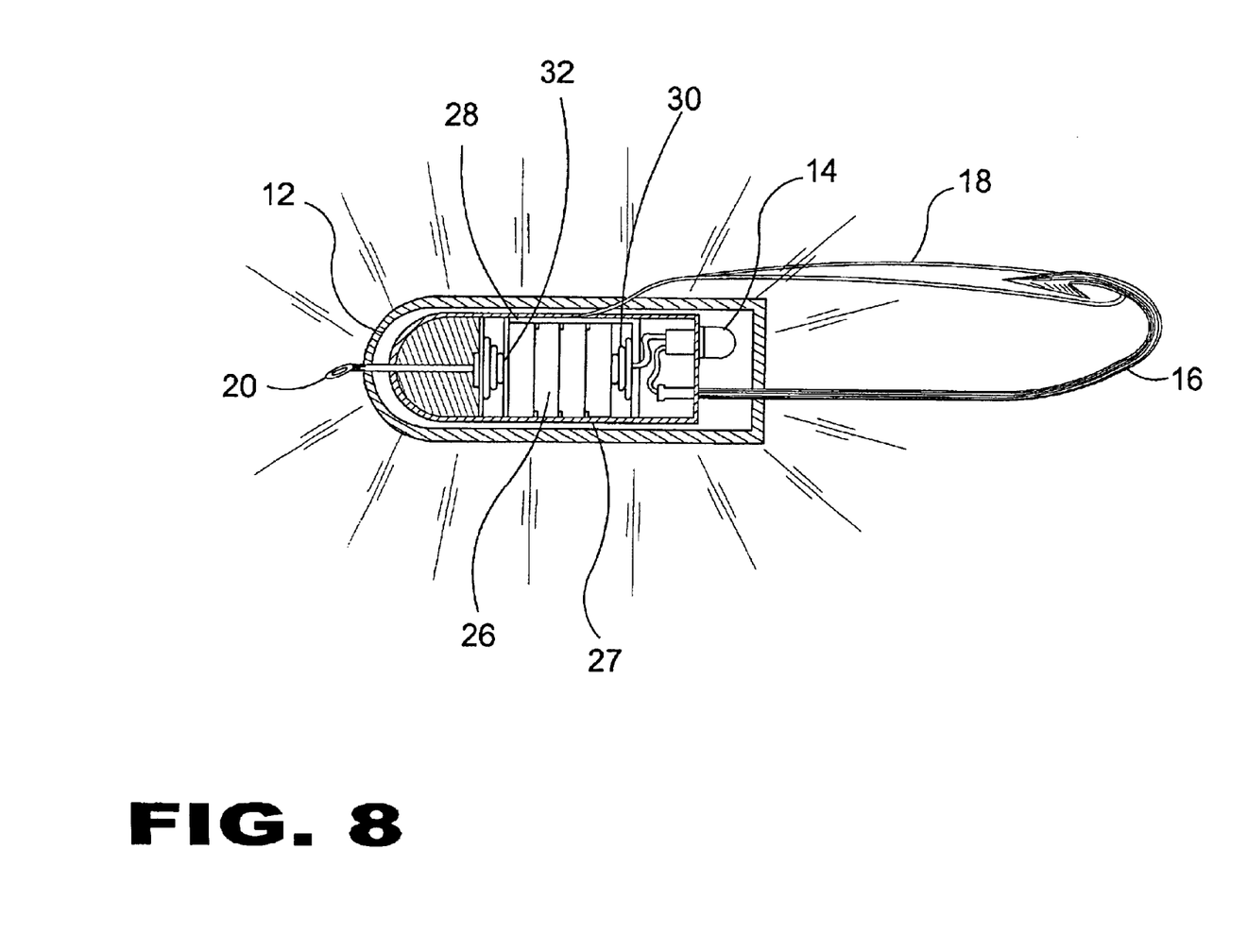
FIG. 8 is a cross-sectional view of the illuminating fishing lure of the present invention where the body of the lure is illuminated by an interior LED light.

FIG. 8 is a cross-sectional view of the illuminating fishing lure of the present invention where the body of the lure is illuminated by an interior LED light. The lure 10 of the present invention includes the body 12. The lure 10 of the present invention includes the body 12. The lure body 12 is preferably cylindrical in shape and has a solid outer casing with a hollow interior. The lure body has a first end and second end. An eye 20 extends from the second end of the lure body 12. The user of the illuminating fishing lure 10 of the present invention connects fishing line through the eye 20 prior to submerging the lure 10 in water. The LED light 14 extends from a first end of the lure body 12, opposite the second end. The LED light 14 is selectively illuminated when power is provided thereto.

Also extending from a first end of the lure body 12 is the hook 16. The hook 16 of the lure 10 has a conventional shape for catching fish. However, the hook 16 of the present invention is formed from an electrically conductive material, such as a metal. Also, the hook 16 should be able to sufficiently resist any corrosive effects caused by prolonged exposure to water. However, while it is preferred that the hook be formed from metal, any material that is both electrically conductive and non-corrosive may be used in the manufacture of the hook 16 for the illuminating lure 10 of the present invention.

The weed guard 18 is connected on the lure body at a position that is substantially between the first end and a second end. The weed guard has a lasso shape that extends substantially to the tip of the hook 16. The weed guard 18 is generally in one of two positions. The first closed position is shown in FIG. 2. The open end of the lasso of the weed guard 18 is shown connected against the tip of the hook 16. The weed guard 18 should be formed from an electrically conductive material and should also be stiff so as to prevent disengagement of the weed guard 18 from the hook 16 without a predetermined amount of force applied thereto. Preferably, the amount of force needed to disengage the weed guard 18 from the hook 16 is the amount of force associated with the closing of a fish's mouth.

Positioned within the lure body 12 of the lure is a metal bracket 28. The metal bracket 28 is positioned within the body 12 at substantially the point where an end of the weed guard 18, opposite the switch point 24, connects to the body 12. The weed guard 18 is mechanically and electrically connected to the body 12 at a connection point 22 wherein it is further connected to the metal bracket 28. Positioned with the metal bracket 28 is the power source 26. Preferably, the power source is at least one battery, however, a plurality of batteries may be used as well. While batteries are the preferred source of power for the power source 26, any material that could provide power may be used by the lure 10 of the present invention. The power source 26 is held securely within the metal bracket 28 by a first and second compression springs, 30 and 32, respectively. The first compression spring 30 is positioned on an inner side of the metal bracket 28 that is closest to the LED light 14. The second compression spring 32 is positioned on an inner side of the metal bracket 28 closest to the eye 20. The power source 26 is connected to an end of the hook 16 that protrudes inside the body 12. The LED light 14 is connected to the metal bracket 28. Alternatively, the power source 26 can be connected to the weed guard 18 and the hook 16 can be connected to the LED light 14.

An electrical circuit is complete when the weed guard 18 contacts the hook 16 at the switch point 24. Upon contact, current flows from the power source 26 through the hook 16 and further through the weed guard 18. Current is then provided to the metal bracket 28 which is connected to the LED light 14. Power is thus provided to the LED light 14 and causes the LED light 14 to be illuminated. The LED light 14 remains illuminated until the weed guard 18 is disengaged from the hook 16 which thereby causes the electrical circuit to be opened and power is prevented from reaching the LED light 14. Additionally, upon completion of the electrical circuit, the power source 26 is recharged by a recharging diode so as to extend the life of the power source 26.

The lure body 12 is also formed form a non-conductive material to provide insulation which prevents the water which comes into contact with the lure body 12 from shorting out the power source 26 located therein.

The lure 10 of the present invention has an outer shell 31 positioned around the lure body 12. The outer shell 31 is preferably translucent so as to allow light to pass through and to give the lure 10 an illuminated effect. While the shell is preferably translucent, the outer shell maybe formed from any material that would allow light from the LED light 14 to provide illumination thereto. The outer shell 31 should also be formed so as to prevent water from entering therein and coming into contact with the lure body 12. Additionally, the outer shell 31 has a recess 33 which is aligned with the hook 16 and a channel 35 aligned with weed guard 18. The hook 16 extends through the recess 33 and form a seal to prevent leakage of water into the space between the lure body 12 and the outer shell 31. The weed guard 18 passes through the channel 35 and forms a seal to prevent leakage of water into the space between the lure body 12 and the outer shell 31. Having a lure 10 with the outer shell 31 is advantages because the outer shell 31 provides an extra layer of protection for the LED light 14 and for the power source 26 positioned within the lure body 12.

Figure 9:
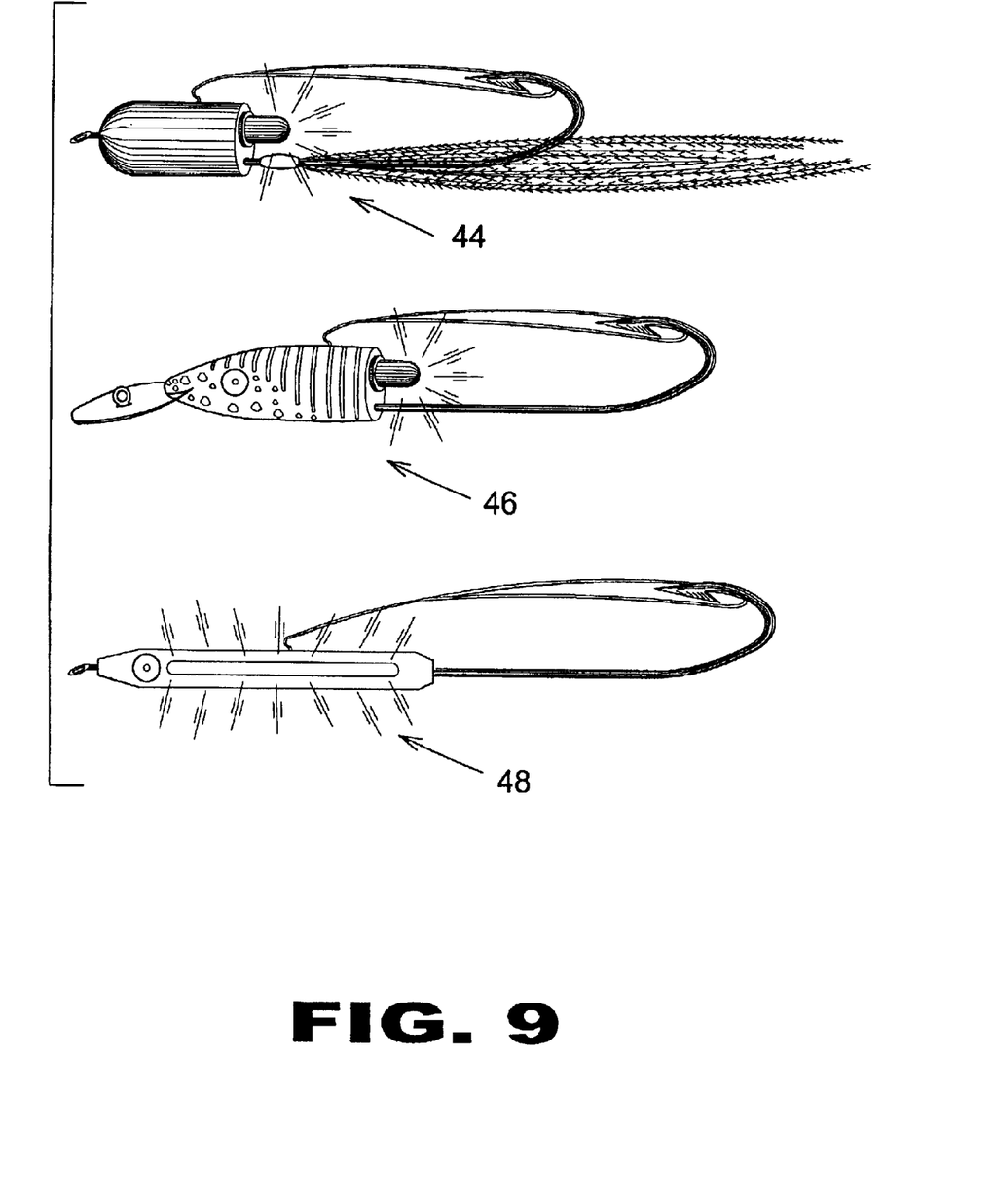
FIG. 9 is a perspective view of the various lure bodies for use with the illuminating fishing lure of the present invention.

FIG. 9 is a perspective view of the various lure bodies for use with the illuminating fishing lure of the present invention. The illuminated fishing lure 10 of the present invention can be applied to a plurality of known lures used for attracting a various species of fish. FIG. 9 shows a streamer lure 44, jerk bait 46, and a diamond jig 48. Each lure depicted in FIG. 9 is shown for purposes of example and any lure used to attract any fish can be formed as discussed with specific reference to FIGS. 2 through 6. All elements as discussed in FIGS. 2 through 6 are present in the lures 44, 46, and 48 as shown herein.

From the above description it can be seen that the illuminating fishing lure of the present invention is able to overcome the shortcomings of prior art devices by providing an illuminating fishing lure 10 that is selectively illuminated upon contact of a weed guard to a hook of the lure. The lure body contains a rechargeable power cell which, upon contact of the weed guard to the hook, provides power to an LED light and recharges the power source as well.

Furthermore, the illuminating fishing lure of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An illuminating fishing lure comprising:
   a) a lure body having a first lure end and second lure end;
   b) a light source positioned on said lure body;
   c) a hook having a base and a barb, said base of said hook is connected to and extends from said first lure end, wherein said base is electrically connected to said light source;
   d) a guard having a first guard end and a second guard end, said guard extends from and is connected to a side of said lure body at a first guard end thereof, said guard has a length substantially equal to said hook to allow contact of said second guard end with said barb; and
   e) a power source having a negative charge end and positive charge end, said positive charge end is connected to said light source and said negative charge end is connected to said first guard end.

2. The illuminating fishing lure as recited in claim 1 further comprising a charging diode for recharging said power source.

3. The illuminating fishing lure as recited in claim 2, wherein said power source is at least one battery.

4. The illuminating fishing lure as recited in claim 1, wherein said lure body includes a metal bracket mechanically and electrically connected to said first guard end for retaining said power source therein.

5. The illuminating fishing lure as recited in claim 4, wherein said metal bracket further comprises a first and second compression spring for retaining said power source within said metal bracket.

6. The illuminating fishing lure as recited in claim 5, wherein said first compression spring is electrically connected to said base of said hook for transferring power from said power source through said hook.

7. The illuminating fishing lure as recited in claim 1 wherein said light source is an LED light.

8. The illuminating fishing lure are recited in claim 6 wherein said metal bracket is connected to said light source for providing power to said light source.

9. The illuminating fishing lure as recited in claim 1 wherein an interior of said lure body is formed from a non-conductive material to prevent shortages caused by submergence of said lure in water.

10. The illuminating fishing lure as recited in claim 1 wherein said hook is formed from an electrically conductive material to freely allow power to pass therethrough.

11. The illuminating fishing lure as recited in claim 1 wherein said guard is formed from an electrically conductive material to freely allow power to pass therethrough.

12. The illuminating fishing lure as recited in claim 1 further comprising an outer shell positioned over and completely encapsulating said lure body.

13. The illuminating fishing lure as recited in claim 12 wherein said outer shell is formed from at least one of transparent, translucent, and opaque materials for diffusing light from said light source thereby causing the entire lure to be illuminated.

14. The illuminating fishing lure as recited in claim 1 wherein said lure is at least one of a streamer, a jerk bait, and a diamond jig.

15. The illuminating fishing lure as recited in claim 1 wherein said lure body has at least one of a cylindrical shape, a square shape, and a cube shape.

16. The illuminating fishing lure as recited in claim 1 wherein said power source is rechargeable by external power source.

17. An illuminating fishing lure comprising:
a) a lure body having a first lure end and second lure end;
b) an light source positioned on said lure body;
c) a hook having a base and a barb, said base of said hook is connected to and extends from said first lure end, wherein said base is electrically connected to said light source;
d) a guard having a first guard end and a second guard end, said guard extends from and is connected to a side of said lure body at a first guard end thereof, said guard has a length substantially equal to said hook to allow contact of said second guard end with said barb;
e) a power source having a negative charge end and positive charge end, said positive charge end is connected to said light source and said negative charge end is connected to said first guard end; and
f) a recharging diode connected to said power source for recharging said power source; wherein upon connection of said second lure end to said barb, power flows from said power source and illuminates said light source and recharges said power source.

* * * * *